United States Patent
Caceres et al.

(10) Patent No.: US 10,152,706 B2
(45) Date of Patent: Dec. 11, 2018

(54) SECURE NFC DATA AUTHENTICATION

(71) Applicant: CELLCO PARTNERSHIP, Basking Ridge, NJ (US)

(72) Inventors: Manuel Enrique Caceres, Basking Ridge, NJ (US); Yuk Lun Li, Morganville, NJ (US); Mohammad Ashfaq Kamal, King Of Prussia, PA (US)

(73) Assignee: Cellco Partnership, Basking Ridge, NJ (US)

( * ) Notice: Subject to any disclaimer, the term of this patent is extended or adjusted under 35 U.S.C. 154(b) by 948 days.

(21) Appl. No.: 13/794,691

(22) Filed: Mar. 11, 2013

(65) Prior Publication Data

US 2014/0256251 A1    Sep. 11, 2014

(51) Int. Cl.

| | |
|---|---|
| *G06Q 20/32* | (2012.01) |
| *H04W 12/08* | (2009.01) |
| *H04B 5/00* | (2006.01) |
| *H04B 5/02* | (2006.01) |
| *H04W 4/00* | (2018.01) |
| *H04W 12/02* | (2009.01) |

(52) U.S. Cl.
CPC ......... *G06Q 20/3226* (2013.01); *G06Q 20/32* (2013.01); *G06Q 20/3229* (2013.01); *G06Q 20/3278* (2013.01); *H04B 5/0031* (2013.01); *H04B 5/0037* (2013.01); *H04B 5/0075* (2013.01); *H04B 5/02* (2013.01); *H04W 4/008* (2013.01); *H04W 12/02* (2013.01); *H04W 12/08* (2013.01); *H04M 2250/04* (2013.01)

(58) Field of Classification Search
CPC .................................................. G06Q 20/3226
USPC ........................................................... 705/65
See application file for complete search history.

(56) References Cited

U.S. PATENT DOCUMENTS

| | | | |
|---|---|---|---|
| 6,567,004 B1 | 5/2003 | Landa et al. | |
| 8,121,620 B2 * | 2/2012 | Kim ..................... | G01S 5/0036 |
| | | | 455/404.2 |
| 8,532,295 B2 | 9/2013 | Benteo et al. | |
| 9,209,866 B2 * | 12/2015 | Ingels .................. | H04B 5/0031 |
| 2007/0001853 A1 * | 1/2007 | Otranen .............. | G06K 7/0008 |
| | | | 340/572.1 |
| 2008/0121687 A1 * | 5/2008 | Buhot ................... | G06Q 20/32 |
| | | | 235/375 |
| 2009/0023476 A1 | 1/2009 | Saarisalo et al. | |
| 2010/0037322 A1 | 2/2010 | Blanchet | |
| 2010/0178868 A1 | 7/2010 | Charrat | |

(Continued)

*Primary Examiner* — Mohammad A. Nilforoush
*Assistant Examiner* — Cristina Owen Sherr

(57) ABSTRACT

A mobile device includes a wireless transceiver, a host processor, a secure element (SE), and a near field communication (NFC) system having an NFC transceiver and an NFC controller implementing a contactless front end. The contactless front end routes a near field communication related to a payment transaction between the NFC system and the SE without going to or from the host processor. The contactless front end routes a near field communication not related to a payment transaction, but requiring a security function, between the NFC system and the SE without going to or from the host processor. The contactless front end routes a near field communication not related to a payment transaction, and not requiring a security function, between the NFC system and host processor without going to or from the SE.

14 Claims, 7 Drawing Sheets

(56) References Cited

U.S. PATENT DOCUMENTS

| | | |
|---|---|---|
| 2010/0210300 A1 | 8/2010 | Rizzo et al. |
| 2011/0170456 A1 | 7/2011 | Marseille et al. |
| 2012/0178366 A1 | 7/2012 | Levy et al. |
| 2012/0209773 A1* | 8/2012 | Ranganathan ......... G06Q 20/40 705/44 |
| 2012/0297204 A1* | 11/2012 | Buer ................... H04L 63/0492 713/193 |
| 2012/0315843 A1 | 12/2012 | Cox |
| 2012/0315972 A1 | 12/2012 | Olson et al. |
| 2012/0317628 A1 | 12/2012 | Yeager |
| 2013/0040566 A1 | 2/2013 | Mourtel et al. |
| 2013/0059568 A1 | 3/2013 | Huque et al. |
| 2013/0124349 A1* | 5/2013 | Khan .................... G06Q 20/36 705/21 |
| 2013/0331029 A1 | 12/2013 | Tang et al. |
| 2014/0057559 A1 | 2/2014 | Smith |
| 2014/0058953 A1 | 2/2014 | Florek et al. |
| 2014/0218177 A1 | 8/2014 | Zhao et al. |
| 2014/0256251 A1 | 9/2014 | Caceres et al. |
| 2014/0370804 A1 | 12/2014 | Dorning |
| 2015/0089586 A1 | 3/2015 | Ballesteros |
| 2015/0287021 A1* | 10/2015 | Itwaru ................ G06Q 20/3276 705/44 |

* cited by examiner

SECURE NFC DATA AUTHENTICATION

BACKGROUND

Mobile commerce, using mobile devices such as smart phones, tablets or the like, is rapidly expanding in popularity. Recently, near field communication (NFC) has been deployed in many types of mobile devices; and NFC has been adopted for a variety of applications, including payment applications. The Isis Mobile Wallet™, for example, was recently launched in the US using NFC for mobile payment. Mobile service providers and their mobile device vendors are deploying a secure element (SE) implemented in the Universal Integrated Circuit Card (UICC) or subscriber identity module (SIM) of new mobile devices to support this NFC based transaction service. For mobile payments using NFC, a secure element is required. In the payment mode, NFC card emulation is required along with the secure element.

When a user brings their mobile device within NFC communication range of an NFC enabled payment terminal at a point of sale (POS) (e.g., a bricks-and-mortar store), the terminal sends out a magnetic field to communicate with Contactless Front End (CLF) provided via an NFC controller in the mobile device. The CLF interprets the command and routes the request appropriately. If the request is for mobile payment, the CLF routes the data to the secure element for authentication. Once the authentication requirement is met, secure information from the SE will be released through a secure channel from the SE through the NFC controller back to the POS terminal. The data flows from the POS to the backend server(s), e.g. to process the payment. Currently, the NFC controller will only route payment transactions to the SE. All other transactions are routed to the host processor of the mobile device.

While this works well for mobile payments, the access to the SE has been limited in functionality and not available for other NFC modes, such as Peer-To-Peer (P2P) and Reader/Writer modes. In non-payment modes, the SE is not available for use to store sensitive information or for authentication.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to mobile device interaction with another device through short range wireless communication, such as Near Field Communication (NFC). The mobile device includes an NFC system comprising a near field communication transceiver and a near field communication controller implementing a contactless front end. In various examples, the contactless front end is configured to determine whether a security function is required and/or what the NFC operation mode is. The operation modes include: (i) card emulation, (ii) peer-to-peer (P2P), and (iii) reader/writer. In card emulation mode, a mobile device acts as a contactless smartcard. In P2P mode, two NFC enabled devices (e.g., two mobile devices) exchange data bi-directionally. In reader/writer mode, an NFC enabled mobile device reads data from and/or writes data to an NFC enabled device, such as an RFID card, tag or the like. For example, when the mobile device is used as a reader in communication with an NFC enabled device, the NFC controller of the mobile device reads a data message from an NFC enabled device and sends the data message to the SE for a security evaluation. When the mobile device is used as a writer, the NFC controller of the mobile device receives security information (e.g., a key) from the SE that is sent to the NFC enabled device.

The NFC communication not requiring a security function is routed between the NFC communication system and a host processor of the mobile device without going to or from the security element. Communication that requires a security function is routed between the near field communication system and the security element without going to or from the host processor. In some examples, a remote server provisions the secure element of the mobile device to allow the host processor to further process the information of the NFC communication.

Figure 1:
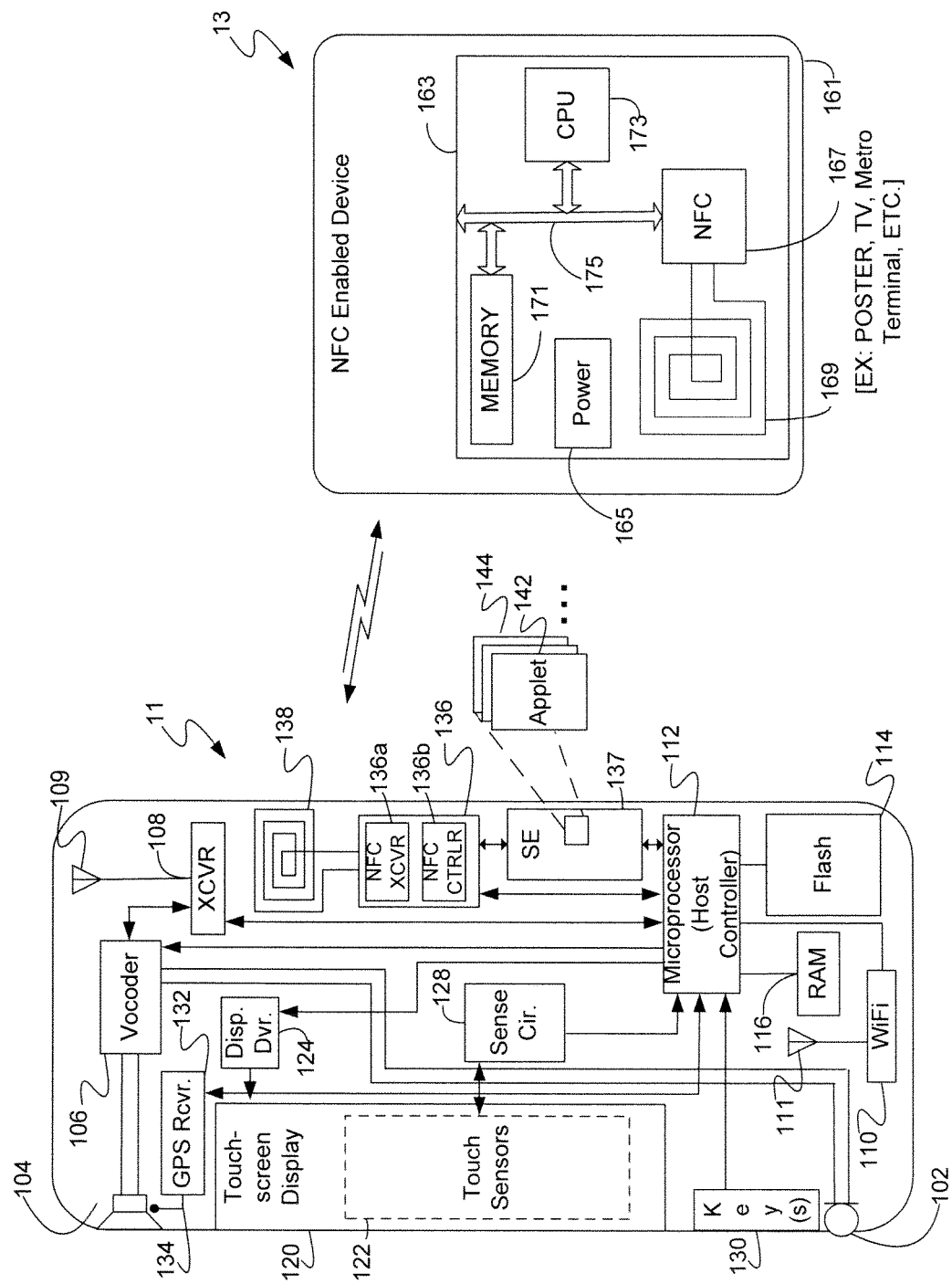
FIG. 1 is a high-level functional block diagram of an exemplary mobile device and an NFC enabled device.

Reference now is made in detail to the examples illustrated in the accompanying drawings and discussed below. FIG. 1 illustrates a mobile device 11 and an NFC enabled device 13 and a relatively short range wireless communication between the mobile device 11 and an NFC enabled device 13. The NFC enabled device 13 represents a variety of NFC enabled devices, including automatic teller machines (ATM), metro terminals, television consoles, posters, locks to contactless entry systems, and the like, which include an NFC chipset. The example uses a Near Field Communication (NFC) system in the mobile device 11 to communicate with the NFC enabled device 13, for example, to provide data to or receive information from the NFC enabled device 13. In an exemplary process, the following steps may take place. At a high level, the user brings the NFC enabled mobile device 11 within proximity (e.g. 2 to 4 cm or less, although in some cases the distance may be up to 20 cm) of the NFC enabled device 13. An application installed on the mobile device 11 listens for NFC events and commences a contactless data flow by establishing communication with the NFC enabled device 13.

In a card emulation mode, the NFC enabled device 13 (e.g., a point of service (POS) terminal, a subway gate, a personal computer, etc.) generates a magnetic field via its antenna 169 and initiates the transaction with the mobile device 11. The magnetic field carries the low-level protocol exchange to perform the payment transaction similar to a payment transaction between a card and a payment terminal. The terminal 13 is the initiator of the exchange and the mobile device answers to the commands sent by the terminal 13. The NFC controller 136*b* forwards data received from the terminal 13 to the secure element (SE) 137 for authentication. When the authentication criterion (or criteria) is met, secure information from the SE is released from the SE 137 through the NFC controller 136*b* to the NFC enabled device 13 (POS terminal in this example).

In a second mode of operation, such as peer-to-peer (P2P), the mobile device 11 initiates a data exchange with another device (e.g., second NFC enabled mobile device). Such data exchange is defined in the ISO 18092 standard. In P2P mode, both devices (mobile device 11 and NFC enabled device 13 in this example) play a symmetric role in that both may generate a magnetic field and transmit and receive data. A typical use case for P2P communication is exchange of "business cards" between two handsets. Traditionally, such exchange is controlled by the host controller 112, without involvement of a security function, leaving the recipient of a payload potentially vulnerable to malware. However, the example uses the NFC controller 136*b* of the mobile device 11 to first determine whether a security function is required. If the security function is not required, the payload is sent to the host controller 112 for processing. However, if a security function is required, the payload from the NFC enabled device 13 is evaluated by the rule-set of the security element 137 before routing the information in the payload to the host controller 112. For example, only if the authentication criterion is met by the SE 137 does the NFC controller allow the host controller 112 to process the information from (or provide information to) the NFC enabled device 13. The authentication and the provisioning of the SE by a remote server is discussed in more detail in a later section.

In a read and/or write mode, the mobile device 11 initiates communication with an NFC enabled device 13. In this (read and/or write) mode, the mobile device 11 is used to emulate the behavior of a contactless card reader. For example, the mobile device 11 communicates with an NFC enabled device 13 (e.g., NFC enabled "smart poster") to access digital content. When a mobile device 11 is brought within range of the smart poster, the NFC controller on the mobile device 11 detects the presence of a contactless tag, generates a magnetic field, which is used to power the contactless tag. Of course, the poster may also have its own power source. The NFC enabled device 13 (smart poster in this example) may be part of a marketing campaign. The NFC enabled device 13 responds with relevant content, such as a URL, SMS text message, coupon code for a discount, etc. Traditionally, such exchange is controlled by the host controller 112, without involvement of a security function, leaving the mobile device 11 vulnerable to potential malware. For example, instead of information that pertains to the poster, the payload may lead to a malicious site or include dangerous command structures, like to "download application, install it, and periodically send location information to a server."

The read/write example uses the NFC controller of the mobile device 11 to first determine whether a security function is required. If a security function is not required, the data message is sent to the host controller 112 for processing. However, if a security function is required, the data message from the NFC enabled device 13 is evaluated by the rule-set of the SE 137. As in the P2P case, in one example, only if the authentication criterion is met by the SE 137 does the NFC controller allow the host controller 112 process the data message (e.g., link to an URL) provided by the NFC enabled device (e.g., smart poster) 13.

The different NFC modes of operation may be implemented via a variety of types of mobile devices having a host controller 112, memory 116 and 114, NFC 136 with a security element 137, and an NFC enabled device 13, which often will also include a processor, memory and an RF (contactless) communication capability. It may be helpful to consider examples of a mobile device 11 and an NFC enabled device 13 in somewhat more detail.

FIG. 1 illustrates elements of the mobile device 11 and elements of the NFC enabled device 13 in functional block diagram form, at a relatively high level. First, we will consider the mobile device 11.

It should be appreciated that the disclosed subject matter may be implemented using any mobile computing device having NFC communication capability and mobile communication capability, configured to use those capabilities to conduct mobile transactions, e.g. for purchasing and data exchange, as discussed herein. In the example of FIG. 1, the mobile device 11 is in the form of a smart phone type mobile handset including a touch screen display 120. Examples of touch screen type mobile devices that may be used to implement mobile device 11 may include (but are not limited to) a smart phone, personal digital assistant (PDA), tablet computer or other portable device with NFC capability. However, the structure and operation of the touch screen type mobile device 11 is provided by way of example; and the subject technology as described herein is not intended to be limited thereto. For purposes of this discussion, FIG. 1 provides a block diagram illustration of the exemplary mobile device 11 having a touch screen display for displaying content and receiving user input as (or as part of) the user interface.

Although the transactions that are the focus of discussions here utilize data communications, a typical mobile device such as the exemplary smart phone 11, also supports voice communications. Hence, in the example shown in FIG. 1, the mobile device 11 includes a microphone 102 for audio signal input and a speaker 104 for audio signal output. The microphone 102 and speaker 104 are communicatively coupled to a voice or audio encoder/decoder (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications.

Also, as shown in FIG. 1, the mobile device 11 includes at least one digital transceiver (XCVR) 108, for digital wireless communications via a wide area wireless mobile communication network, although the mobile device 11 may include additional digital or analog transceivers (not shown). The transceiver 108 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 108 provides two-way wireless communication of information including digitized audio signals, still image and/or video signals, web page information for display as well as web related inputs, and various types of mobile message communications to/from the mobile device 11.

Several of these types of communications through the transceiver 108 and a network, as discussed later, will relate to provisioning of the SE 137 by a remote server. On-line transaction related communications involving information obtained from the NFC enabled device 13, for example, often utilize Internet Protocol (IP) packet data transport utilizing the digital wireless transceiver (XCVR) 108 and over the air communications to and from base stations of the serving mobile network. Such communications may include specific account related data and security information from the mobile device 11, as well as payload information received from an NFC enabled device 13 during a particular transaction. Accordingly, such wireless transaction data communications may include at least some of the data obtained from the NFC enabled device 13.

In one example, the transceiver 108 also sends and receives a variety of signaling messages in support of various voice and data services provided by a network of a wireless service provider, to a user of mobile device 11 via the mobile communication network. Transceiver 108 connects through radio frequency (RF) send-and-receive amplifiers (not separately shown) to an antenna 109. Transceiver 108 may also support various types of mobile messaging services, such as short message service (SMS), enhanced messaging service (EMS), and/or multimedia messaging service (MMS). Although transaction communications involving account data obtained from the NFC enabled device 13 typically utilize IP data transport, such transaction communications may at times utilize one or more of these mobile messaging services for the data transport through the mobile communication network.

Many modern mobile devices also support wireless local area network communications over WiFi, instead of or in addition to data communications using the wide area mobile communication network. Hence, in the example of FIG. 1, for packet data communications, the exemplary mobile device 11 may also include a WiFi transceiver 110 and associated antenna 111. Although WiFi is used here as the example, the transceiver 110 may take the form of any available two-way wireless local area network transceiver of a type that is compatible with one or more standard protocols of communication implemented in wireless local area networks, such as one of the WiFi standards under IEEE 802.11 and/or WiMAX. The transceiver 110, for example, may provide two-way data transport for wireless communication with a wireless access point in a residence or enterprise that the user frequents or with any available hotspot offered in a public venue. Although communicating through a different network or networks, the transceiver 110 supports various types of data communications similar to the packet data communications supported via the mobile network transceiver 108, including communications related to transactions involving data obtained from the NFC enabled device 13 and provisioning the secure element 137 with data obtained from a remote server.

The mobile device 11 further includes a microprocessor, sometimes referred to herein as the host processor 112, which serves as a programmable controller for mobile device 11 by configuring mobile device 11 to perform various operations, for example, in accordance with instructions or programming executable by processor 112. For example, such operations may include various general operations of the mobile device 11 as well as operations related to the communication with the NFC enabled device 13 and conducting related transactions as described herein. A flash memory 114 is used to store, for example, programming or instructions for execution by the processor 112. Depending on the type of device, the mobile device 11 stores and runs an operating system through which specific applications may be run on the device. Examples of operating systems include Android, Apple iOS (I-Phone or iPad devices), Windows Mobile, RIM BlackBerry operating system, or the like. Flash memory 114 may also be used to store mobile configuration settings for different mobile applications or services executable at mobile device 11 (using processor 112). Mobile device 11 may also include a non-volatile random access memory (RAM) 116 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the interaction with the NFC enabled device 13 and related transactions, as described herein. Program aspects of the technology may be thought of as "products" or "articles of manufacture" typically in the form of executable code or process instructions and/or associated data that is stored on or embodied in a type of machine or processor readable medium.

A mobile device supporting read/write, P2P, and card emulation and related transaction communications of the type under consideration here, may include a variety of different types of user interface elements. For discussion purposes, in the smart phone example shown in FIG. 1, the user interface elements of mobile device 11 include a touch screen display 120 (also referred to herein as "touch screen 120" or "display 120"). For output purposes, the touch screen 120 includes a display screen, such as a liquid crystal display (LCD) or the like. For input purposes, touch screen display 120 includes a plurality of touch sensors 122. Other interface elements may include a keypad including one or more keys 130. For example, the keypad may be implemented in hardware as a T9 or QWERTY keyboard of mobile device 11 and keys 130 may correspond to the physical keys of such a keyboard. Alternatively, keys 130 (and keyboard) of mobile device 11 may be implemented as "soft keys" of a virtual keyboard graphically represented in an appropriate arrangement via touch screen display 120. The soft keys presented on the touch screen display 120 may allow the user of mobile device 11 to invoke the same user interface functions as with the physical hardware keys. In some implementations, the microphone 102 and speaker 104 may be used as additional user interface elements, for audio input and output, including with respect to some functions related to the transaction processing and communication, as described herein.

For output, touch screen display 120 is used to present information (e.g., text, video, graphics or other visible content) to the user of mobile device 11. Host processor 112 controls visible display output on the LCD or other display element of the touch screen display 120 via a display driver 124, to present the various visible outputs to the device user. For example, some of the transaction related programming may cause the processor 112 to operate the driver 124 to cause screen 120 to display visible multimedia information about a product or service that the user may desire to purchase via a payment transaction using account information obtained from the NFC enabled device 13.

In general, touch screen display 120 and touch sensors 122 (and one or more keys 130, if included) are used to provide the textual and graphical user interface for the mobile device 11. In an example, touch screen display 120 provides viewable content to the user at mobile device 11. Touch screen display 120 also enables the user to interact directly with the viewable content provided in the content display area, typically by touching the surface of the screen with a finger or an implement such as a stylus.

As shown in FIG. 1, the mobile device 11 also includes a sense circuit 128 coupled to touch sensors 122 for detecting the occurrence and relative location/position of each touch with respect to a content display area of touch screen display 120. In this example, sense circuit 128 is configured to provide processor 112 with touch-position information based on user input received via touch sensors 122. In some implementations, processor 112 is configured to correlate the touch position information to specific content being displayed within the content display area on touch screen display 120. The touch-position information captured by sense circuit 128 and provided to processor 112 may include, but is not limited to, coordinates identifying the location of each detected touch with respect to the display area of touch screen display 120 and a timestamp corresponding to each detected touch position.

The user interface capabilities of the mobile device 11 provide output to and receive input from the user of the mobile device 11, for any of the various functions, operations or applications of the device. For example, programming (discussed more later) that configures the mobile device 11 to obtain and act on information from the NFC enabled device 13 and causes the mobile device to perform a security function may include further acknowledgment requests from the user. For example, the mobile device 11 may present URL information read from the NFC enabled device 13 on the display 120 during a transaction on the account and prompt the user whether they indeed would like to visit the site.

Many implementations of mobile devices today support location based services, which are quite popular now, particularly with smart phone and tablet users. Location information today may be used in a variety of services/applications. Of note for purposes of this discussion, some uses or transactions involving account or other information obtained from or provided to the NFC enabled device 13 may also involve location determination. For example, the location information of the NFC enabled device 13 may be part of the information provided to the security element 137 or to a remote server (e.g., provisioning server discussed later) to determine the authenticity of the content provided by the NFC enabled device 13. By way of just one example, at this point in our discussion, the current location of the device 13 may be recorded in memory of the device and/or communicated to a server or other equipment involved in a transaction, when the mobile device communicates over a network (e.g. to conduct a transaction) using the information obtained from the NFC enabled device 13.

There are a variety of ways that a mobile device 11 may be configured to obtain information as to current location of the device. In our example, the mobile device 11 includes a global positioning satellite (GPS) receiver 132 and associated antenna 134. GPS is a space-based satellite navigation system that provides location and time information anywhere on Earth, where there is an unobstructed line of sight to at least three, or more of the GPS satellites.

The mobile device 11 also has NFC communication capability. NFC may be used for a variety of different functions or applications of the mobile device 11. However, for purposes of this discussion, the mobile device 11 interacts with the NFC enabled device 13 via the NFC communication capability of the mobile device 11. NFC is a set of standards for smart phones and similar devices, such as the exemplary mobile device 11 discussed here, to establish radio communication with other such devices as well as with compatible NFC readers by coming to close proximity (e.g., 4-10 cm or less). Due to its short range and support for encryption, NFC communication is suitable for secure communication over short distances. Each NFC enabled mobile device or NFC enabled device (e.g., a smart poster, a contactless terminal such as that at a point of sale, etc.,) includes a transceiver configured to communicate with other NFC capable equipment.

Hence, the exemplary mobile device 11 further includes an NFC sensor. The NFC sensor may be implemented in a variety of ways. In the exemplary mobile device 11 of FIG. 1, the NFC sensor includes an NFC type radio frequency transceiver 136*a*, which is formed by an NFC chipset 136. The NFC chipset 136 provides two-way wireless communication of information in accordance with NFC technology and protocols. The NFC chipset 136 includes an NFC controller 136*b*. For simplicity, the NFC 136 is sometimes referred to herein as the NFC controller 136, while it will be understood that it is a controller within the NFC chipset 136. The exemplary NFC sensor also includes an antenna, such as coil antenna 138. The NFC chipset 136 of device 11 connects to the NFC coil antenna 138, for transmitting and receiving NFC communications to/from other NFC compatible devices with compatible transceivers over short air link distances. The transceiver 136*a* formed by the NFC chipset 136 also sends and receives a variety of signaling messages for establishing NFC links with other NFC-enabled devices and sends and receives various user data over the established NFC links. The signaling, for example, may allow the transceiver formed by the NFC chipset 136 to detect proximity of another NFC capable device, establish an NFC link with the other device, trigger execution of an appropriate application within the mobile device 11 and send and/or receive data for the application as between the mobile device 11 and the other NFC capable device. Some modern mobile devices are already coming equipped with such NFC equipment, and increased NFC deployment is expected in the near future.

In order to run secure applications such as payment, access to buildings, routing to an URL site, and the like, there is a Secure Element (SE) 137. In one example, the SE 137 is separate chip that includes tamperproof storage and execution memory and is configured to communicate with an NFC controller 136*b* (a secure processor). The NFC controller 136*b* is different from the host processor 117 in that it focuses on enabling secure transactions. The SE 137 contains applications (e.g., applets) that use secure keys running inside the secure processor. For example, there may be at least one applet 142 for processing of the payment transaction; and at least one applet 143 for processing of at least one type of communication not related to a payment transaction, such as a read/write or P2P operation.

For example, the applications that run on the SE typically run on a Javacard operating system. The SE may include various account information, such as account number, user identification, a personal identification number (PIN), or the like for user verification and possibly account balance and/or transaction record information. The SE may be used to decode credentials of NFC enabled devices. In various examples, the secure element may be part of a subscriber identification module (SIM) chip or a separate secure element like a secure digital (SD) memory card used for storing and accessing applications and data in a secure manner.

Although cryptographic elements are not separately shown, the NFC chip 137 is also configured such that transmissions to the NFC enabled device 13 are encrypted. In one example, communications between the SE and the provisioning server may also be encrypted. Accordingly, the secure data storage and encrypted communication provide enhanced security and reduce the likelihood of fraud against a user's financial account.

In one example, the NFC controller 137 is configured to route all NFC traffic (e.g., data message from or sent to an NFC enabled device) through a SE 137. Put differently, the NFC controller 137 routes the NFC communication between the NFC system and the SE 137 without going to or from the host processor 112.

However, it will be understood that not all applications require the use of a security function. For example, two mobile device users may want to exchange business cards. To this end, the NFC controller should have the ability to send the information directly to the host processor 112 for further execution (without the security function of the SE 137). Accordingly, in one example, the NFC controller 137 is configured to determine whether a security function is required. If so, the NFC controller 137 routes the near field communication between the NFC system and the SE 137 without going to or from the host processor 310. However, upon determining that a security function is not required, the NFC communication is routed between the NFC system and the host processor 112 without going to or from the SE 137.

The NFC controller 137 determines whether a security function is required in various ways. For example, if the mode of operation is card emulation (e.g., payment), a security function is required to keep the transaction secure. Also, if the data message from the NFC enabled device 13 includes a key, a security function is required. In another example, if the payload of the data message includes a link to a Universal Resource Locator (URL), a security function is required. In another example, even if the communication may not require a security function (e.g., a simple transfer of a photo between two NFC enabled mobile devices) the user of the transferor or transferee (i.e., writing or reading) mobile device can request the transaction to be secure (e.g., by selecting "secure transfer" on the display of the mobile device). For example, the user of a mobile device can pre-configure their mobile device by selecting an option (e.g., on the user display) that requires information that is received and/or transferred to another mobile device to be secure. The security requirement may be with respect to all NFC communication or more focused (e.g., all mobile devices that are not on a "close friends" or "authorized" list stored in the mobile device). Thus, a mobile device that is pre-configured to receive secure NFC communication, routes the data message received from another mobile device to the SE for evaluation. If a security key is not included in the data message, then the message is deemed not secure. To assure that the data message is processed by the transferee mobile device, the NFC controller of the transferor mobile device includes a key (provided by the SE) in the data message. To this end, the transferor mobile device may be preconfigured to send data messages via NFC in a secure manner (i.e., with a key).

In another example, all NFC communication is routed to the SE. In this example, if the data message does not include a key, it is considered not secure. Consequently, the host controller is prevented from executing any instructions in the data message. In one example, the display of the mobile device indicates that the data message could not be authenticated and provides an option to override the security feature. Put differently, the user of the mobile device can override the security function and select to have the data message processed (e.g., go to an URL) even if the SE cannot authenticate the security of the data message.

The logic implemented by the host processor 112 of the mobile device 11 configures the processor 112 to control various functions as implemented by the mobile device 11. The logic for a processor may be implemented in a variety of ways, but in our example, the processor logic is implemented by programming for execution by the microprocessor 112. Similarly, logic implemented by the NFC controller 136*b* configures the controller 136 to control various functions related to NFC communication. For example, one or more application programs are stored in the SE 137 memory for execution by the NFC controller 136*b*. Any application that is intended to utilize account related information obtained from the NFC enabled device 13 may include information stored in the SE 137 memory. For example, information in connection with a transaction with an NFC enabled device 13 is stored in the SE 137 memory, which when executed by the microprocessor 112 enables the mobile device 11 to perform transactions (e.g., purchase, ATM, unlock door, provide preferences to a TV console, etc.) with the NFC enabled device 13 using the NFC sensor formed by the NFC chipset 136 and the associated antenna 138. As disclosed above, transactions that meet a predetermined criteria (i.e., requiring a security function) are first routed through the SE 137.

The structure and operation of the mobile device 11, as outlined above, were described to by way of example, only.

The NFC enabled device 13 in our example includes a power supply module 165, an NFC transceiver 167 and associated coil antenna 169, and one or more memories 171. The NFC enabled device 13 may or may not include a processor serving as the central processing unit (CPU) 173 of the chip 163 and a bus system 175. For example, a CPU may not be included if the NFC enabled device 13 is used as a tag but otherwise is included if used in a P2P transaction. The NFC enabled device 13 may or may not include a battery or other internal power source. For example, instead of a power source, the power module 165 may collect energy at the time of a communication from the RF transmissions from the mobile device 11 via inductive coupling. Power may be obtained via the coil antenna 169 or another inductive coil (not separately shown) in or connected to the chip 163. The power module 165 converts the collected energy to one or more appropriate direct current (DC) voltage levels and distributes the resulting DC power to the other elements on the chip 163, as needed.

The exemplary NFC transceiver 167 connects to the coil antenna 169, for transmitting and receiving RF communications to/from the NFC enabled mobile device 11. Hence, the chipset 136 and NFC transceiver 167 are sufficiently compatible to enable the mobile device 11 to detect and communicate with an NFC enabled device 13. In one example, from the perspective of the card, the NFC enabled mobile device 11 can appear as a reader NFC enabled device. Put differently, the NFC enabled device 13 may act as a tag and the mobile device 11 may act as a reader when in read/write mode of operation.

The memory 171 of the NFC enabled device 13 stores data and/or executable programming for the CPU 173. For example, if the NFC enabled device 13 is configured as a smart poster, the memory may include URL information where the user of the mobile device 11 can obtain additional information. In one example, the memory 171 may also include a key that is used for security purposes by the SE 137 of the mobile device 11. For example, this key may be provided by a provisioning server (discussed later) during a prior provisioning process. Thus, in this smart poster example, they payload provided by the NFC enabled device 13 to the mobile device 11 includes digital payload (e.g., URL) and a key (provided by the provisioning server). The NFC controller 136*b* of the mobile device, upon determining that a security feature is required, sends the payload to the SE 137 for authentication. Upon authentication, the NFC controller routes the payload (e.g., without the key) to the host controller 112 for processing.

The bus 175 supports signaling and transfer of data and/or instructions as between various elements on the chip 163 including the CPU 173, the memory 171 and the NFC transceiver 167. The memory 171 and programming execution by the CPU 173 provide data storage.

The NFC enabled device 13 can be used in a variety of transactions/applications. Typical examples of actions using such an NFC enabled device include but are not limited to financial transactions (e.g., point of sale terminal), access control (e.g., a smart door or computing device that can be unlocked via an NFC, or TV that can be configured for user preferences), exchange of digital information (e.g., transferring and/or receiving photos between two mobile devices or serving as a smart poster), etc. By enabling the mobile device 11 to communicate with the NFC enabled device 13 in a secure manner, the uses of the NFC enabled device and the information read/obtained from the NFC enabled device can be extended to the user's mobile device 11. Using the NFC technology of the mobile device 11, one or more applications on the mobile device 11 can detect and interact with an NFC enabled device 13, to obtain and/or provide information to and/or from the NFC enabled device 13 and then use that information in a subsequent action.

The structure and operation of the NFC enabled device 13, as outlined above, were described to by way of example, only.

Figure 2:
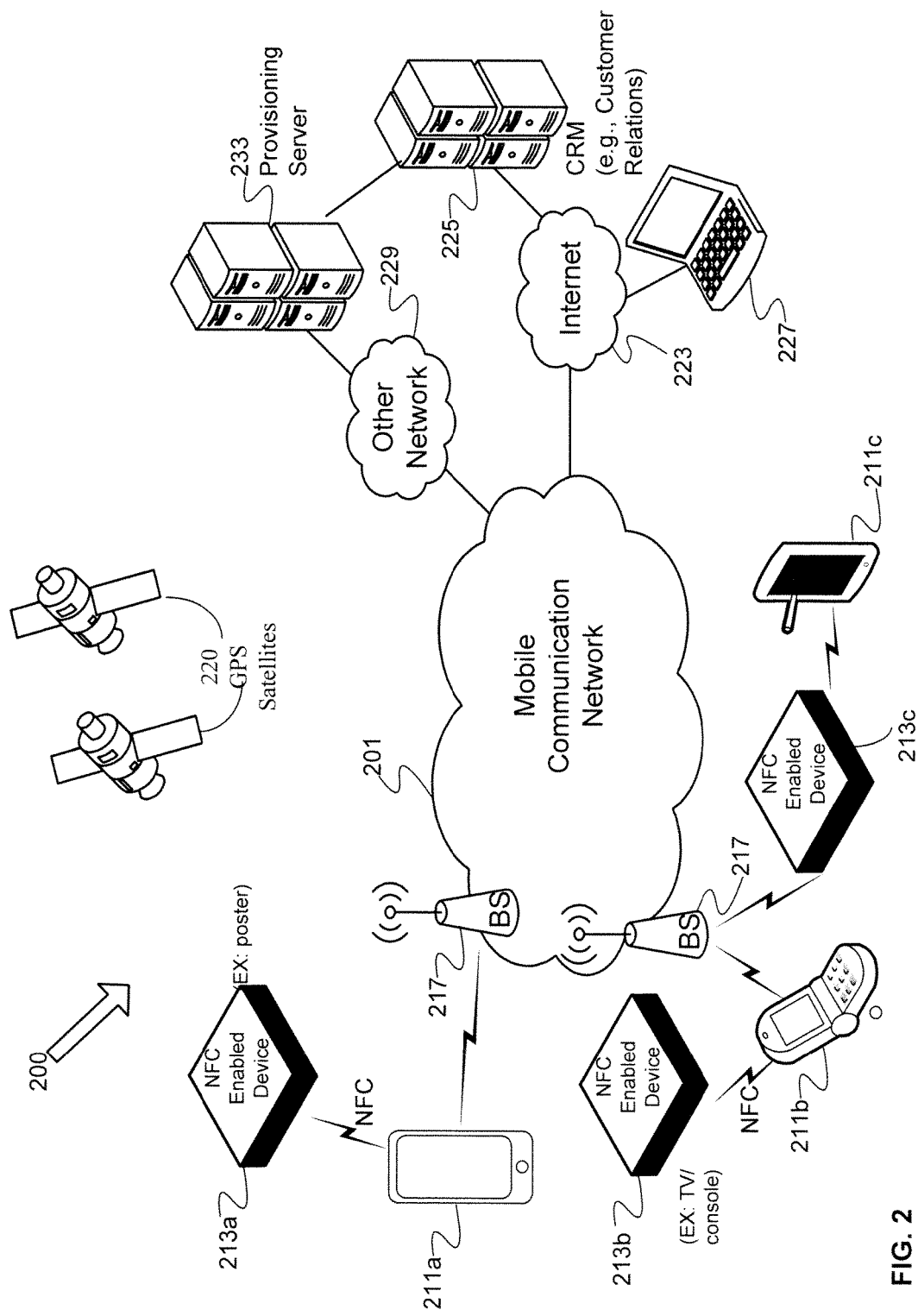
FIG. 2 is a high-level functional block diagram of a system offering a framework to provide NFC communication between a mobile device and an NFC enabled device and for provisioning of a mobile device for secure NFC communication with the NFC enabled device.

FIG. 2 illustrates a system 200 offering a framework to provide NFC communication between a mobile device (e.g., 211*a* to 211*c*) and an NFC enabled device (e.g., 213*a* to 213*c*) and for provisioning of a mobile device for secure NFC communication with another device. The example of FIG. 2 shows several mobile devices 211*a* to 211*c* (collectively referred to as mobile devices) that are examples of devices that may be used for communicating with NFC enabled devices 213*a* to 213*c* (i.e., through NFC communication) when a mobile device is in close proximity to a respective NFC enabled device. For purposes of provisioning of a security element (SE) on the mobile device, each mobile device may have access to the mobile communication network 201.

NFC enabled devices 213*a* to 213*c* each include an NFC system configured to communicate with NFC capable mobile devices 211*a* to 211*c*. Each NFC enabled device 213*a* to 213*c* provides two-way wireless communication of information in accordance with NFC technology and protocols. For example, a mobile device 211*a* can communicate with an NFC enabled device 213*a* to provide preferences or payment information and/or receive information from the NFC enabled device 213*a*. NFC enabled devices may be stationary (e.g., at an entrance as part of a keyless entry system or embedded in a smart poster), or mobile (e.g., another NFC enabled mobile device).

In the example of FIG. 2, the mobile communication network 201 provides communications for mobile devices 211*a* and 211*b* as well as for mobile devices/users that do not participate in NFC-based services (e.g., regular mobile devices such as cell phones, tablet computers, etc., that do not include NFC chip sets or devices that have such chip sets but whose users do not participate in any NFC-based service). Thus, network 201 may provide regular voice and data cellular services. The network 201 provides wireless communications services to the mobile devices shown and other mobile devices (not shown), via a number of base stations (BSs) 217. The present techniques may be implemented in any of a variety of available mobile networks 201 and/or on any type of mobile device compatible with such a network 201, and the drawing shows only a very simplified example of a few relevant elements of the network 201 for purposes of discussion here.

The mobile communication network 201 may be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Long Term Evolution (LTE) standard, or other standards used for public mobile wireless communications. In one example, the mobile devices 211*a* and 211*b* are capable of voice telephone communications through the network 201, and for receiving provisioning information from the provisioning server 233. The mobile devices 211*a* to 211*c* are capable of data communications through the particular type of network 201, and the users thereof typically will have subscribed to data service through the network.

The network 201 allows users of the mobile devices such as 211*a* to 211*c* (and other mobile devices not shown) to receive security information, (e.g., security keys), from a provisioning server 233.

The mobile communication network 201 can be implemented by a number of interconnected networks. Hence, the overall network 201 may include a number of radio access networks (RANs), as well as regional ground networks interconnecting a number of RANs and a wide area network (WAN) interconnecting the regional ground networks to core network elements. A regional portion of the network 200, such as that serving mobile devices 211*a* to 211*c*, can include one or more RANs and a regional circuit and/or packet switched network and associated signaling network facilities.

Physical elements of a RAN operated by one of the mobile service providers or carriers include a number of base stations represented in the example by the base stations (BSs) 217. Although not separately shown, such a base station 217 can include a base transceiver system (BTS), which can communicate via an antennae system at the site of base station 217 and over the airlink with one or more of the mobile devices, when the mobile devices 211a to 211c are within range. Each base station 217 can include a BTS coupled to several antennae mounted on a radio tower within a coverage area often referred to as a "cell." The BTS is the part of the radio network that sends and receives RF signals to/from the mobile devices 211a to 211c that are served by the base station 217. The network can also include other elements that support functionality other than device-to-device media transfer services such as messaging service messages and voice communications. Specific elements of the mobile communication network 201 for carrying the voice and data traffic, and for controlling various aspects of the calls or sessions through the network 201, are omitted here for simplicity. It will be understood that the various network elements can communicate with each other, as well as other aspects of the mobile communication network 201, and other networks (e.g., the public switched telephone network (PSTN) and the Internet 223) either directly or indirectly.

The carrier may also operate a number of systems that provide ancillary functions in support of the communications services and/or application services provided through the mobile communication network 201, and those elements communicate with other nodes or elements of the mobile communication network 201, such as one or more private IP type packet data networks 229 (sometimes referred to as an Intranet), i.e., a private network. Generally, such systems are part of or connected for communication via the private network 229 of the establishment discussed herein. It will be understood that systems outside of the private network could serve the same functions as well. Examples of such systems, in this case operated by the network service provider as part of the overall system 200, which communicate through the intranet type network 229, include one or more provisioning servers 233.

Provisioning server 233 is configured to provide various functions, including the function of determining whether information received by a mobile device from an NFC enabled device (e.g., 213a to 213c) is secure. In one example, the provisioning server 233 provisions (e.g., provides keys, access codes, security parameters, etc., to) the SE of the NFC system of the mobile device 211a via the mobile communication network 201. In various examples, the communication between the provisioning server 233 and the mobile device (e.g., 211a) is initiated by the provisioning server 233 (e.g., for regular security and/or user preferences updates) or upon a request from the mobile device 211a.

In one example, the provisioning server 233 may provide provisioning information to an application installed on the mobile device (e.g., 211a). The provisioning information received by the application on the mobile device 211a may include security parameters, access codes, and the like. For example, the application may program the security element of the mobile device 211a to update the security information and/or provide access authorization information to the mobile device 211a. The security information may include keys that are used to unlock the payload received from an NFC enabled device 213a by the mobile device 211a. For example, when a mobile device 211a comes into close proximity (e.g., e.g. 2 to 4 cm or less) to an NFC enabled device 213a (e.g., NFC enabled smart poster) to receive information therefrom, the NFC controller of the mobile device 211a may determine that a security check should be performed based on the payload received from the NFC enabled device 213a. The SE of the mobile device 211a informs the NFC controller whether the information obtained from the NFC enabled device 213a (a movie poster in this example) is secure. For example, the secure element has been pre-programmed by the application of the mobile device based on prior provisioning information (e.g., keys) received from the provisioning server 233. In one example, if the secure element of the mobile device has not been pre-programmed, the NFC controller (via the program) sends the payload obtained from the NFC enabled device 213a to the provisioning server 233 to receive provisioning information from the server. The secure element is then programmed by the application based on the information provided by the provisioning server 233. Thus, the secure element can be both pre-programmed (before a communication with an NFC enabled device 213a) or programmed after receiving a payload from the NFC enabled device 213a. The secure element can then determine whether the information obtained from the NFC enabled device 213a via an NFC communication is secure to be executed by the host processor of the contactless frond end of the mobile device 211a.

In one example, the system 200 includes a plurality of satellites 220 to provide location information to a mobile device (e.g., 211a) and/or an NFC enabled device (e.g., 213a) where there is an unobstructed line of sight between the satellites 220 and the receivers. For example, the mobile device 211a may use its GPS receiver to determine the location information of an NFC enabled device 213a (e.g., poster) that is within range of NFC communication. For an additional level of security, the location information may be appended to the data message received from the NFC enabled device 213a and then sent to the SE of the mobile device 211a. In this example, the SE would include the location information in determining whether to allow the host processor to execute the information in the payload. For example, the data message is logged in a memory of the SE. The SE also has stored in its memory location information for respective NFC enabled devices. The location information and keys are provided by the provisioning server 233. Accordingly, if the poster is not within a predetermined radius of the stored location information, the message provided by the poster is prevented from being executed by the host processor of the mobile device 211a. In one example, a warning is displayed on the user interface of the mobile device indicating that the NFC enabled device (i.e., poster in this example) is not where it should be. In one example, the user can choose to accept the risk and process the data message received from the poster.

The provisioning server 233 may also include or have access to a CRM server 225 that includes a customer information database. For example, CRM server 225 may include basic key facts about the customer, such as: age, subscription information, and/or customer preferences. For example, the customer may have subscribed to TV channels, be entitled to services, or have authorization to a keyless entry system. This information may be stored in the CRM server 225. In one example, the CRM server 225 offers its account holders on-line access to a variety of functions related to the account holders' accounts, such as prior purchases, the last product/service ordered, on-line payment information, subscription changes, etc. The information may be used by the provisioning server 233 to provide relevant keys during provisioning of a mobile device 221a and determine when to provision a mobile device 211a. For example, a user at a hotel may want to have a smaller suite on Monday and upgrade to a larger suite on Tuesday in anticipation of additional family members. The CRM may be preprogrammed to indicate that on Monday, the user is assigned to room 102 and on Tuesday to room 908. When the suite becomes available on Monday, the CRM notifies the provisioning server 233 to provision the mobile device 211*a* of the user for access to room 102. Accordingly, the SE of the mobile device 211*a* is programmed to include the electronic key for room 102. On Tuesday, the CRM notifies the provisioning server 233 to provision the mobile device 211*a* to remove access to suite 102 and replace it with suite 908. Upon receiving the key from the provisioning server 233, the SE removes the key for suite 102 and replaces it with 908. Thus, in this example, when a user brings their mobile device 11 within communication range of the keyless entry lock (e.g., an NFC enabled device) of room 908, the NFC system 136 of the mobile device 11 provides the key from the SE 137 to unlock the keyless entry lock.

In one example, CRM server 225 provides an interface via the Internet 223 for a user or account holder. For example, a user's terminal, such as PC 27, may be used to access on-line information about an account holder's (i.e., user's) account. In one example, CRM 225 is configured to receive information from the user via a PC 27 over the Internet 223, including but not limited to TV channel access, when and/or how often the mobile device should be provisioned, and the level of security desired (e.g., electronic key only; electronic key plus biometric information from mobile device; electronic key plus biometric information plus location information; etc.). The information is sent to the provisioning server 233 when a condition is met (e.g., when changes to a user account are made, at predetermined intervals, or upon request from the mobile device for security authentication). Thus, when the NFC system 136 of the mobile device 11 is later involved in an NFC communication with an NFC enabled mobile device 13, the SE is ready to provide the requisite authentication upon request from the NFC controller 136*b*.

While in the example of FIG. 2 the provisioning server 33 and the CRM 25 have been illustrated as separate servers, the functionality described herein with respect to each of the servers 233 and 225 can also be provided by one or multiple different computing devices. In other words, the provisioning server 233 and the CRM server 225 need not be stand-alone computing devices but can be combined in various configurations with each other and/or with other server functions.

The structure and operation of system 200, as outlined above, were described by way of example only.

Figure 3A:
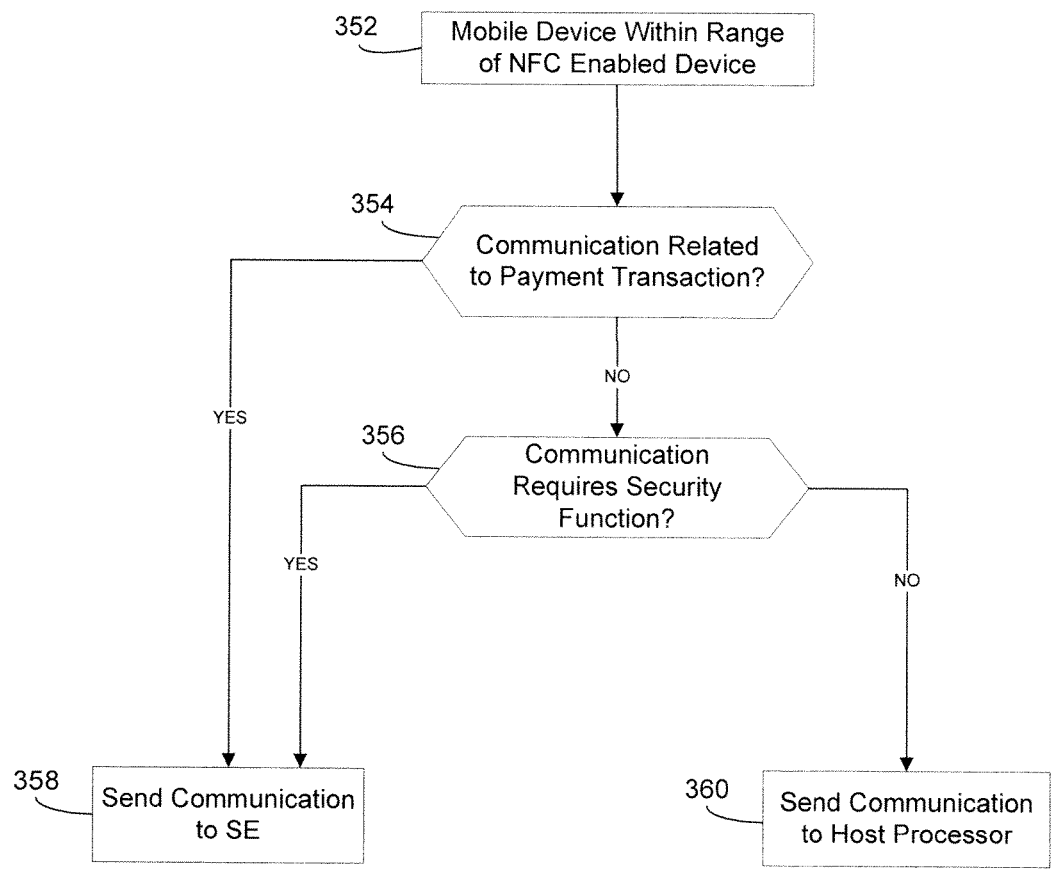
FIG. 3a is an exemplary flow chart useful in understanding interaction between the mobile device and an NFC enabled device.

With the foregoing overview of the system 200, it may be helpful now to consider a high-level discussion of exemplary communication flow. FIG. 3*a* is a simplified communication flow illustrating communication that can be routed to the SE instead of the host processor.

At step 302, the user brings the NFC enabled mobile device 11 within proximity of an NFC enabled device 13. Thus, the NFC system 136 of the mobile device 11, comprising an NFC transceiver 136*a* and an NFC controller 136*b* (i.e., implementing a contactless front end) can communicate with the NFC enabled device 13.

At step 354, the contactless front end determines whether the near field communication related to a payment transaction between the NFC system 136 and the SE 137 (i.e., without going to or from the host processor 112). If so, at step 358, the communication is routed to the SE 137.

However, if the communication is not related to a payment transaction, at step 356 the contactless front end determines whether the near field communication requires a security function. If so, the method continues with step 358, as discussed above.

However, if the contactless front end determines that the near field communication does not require a security function, then at step 360, the communication is sent to the host processor.

Figure 3B:
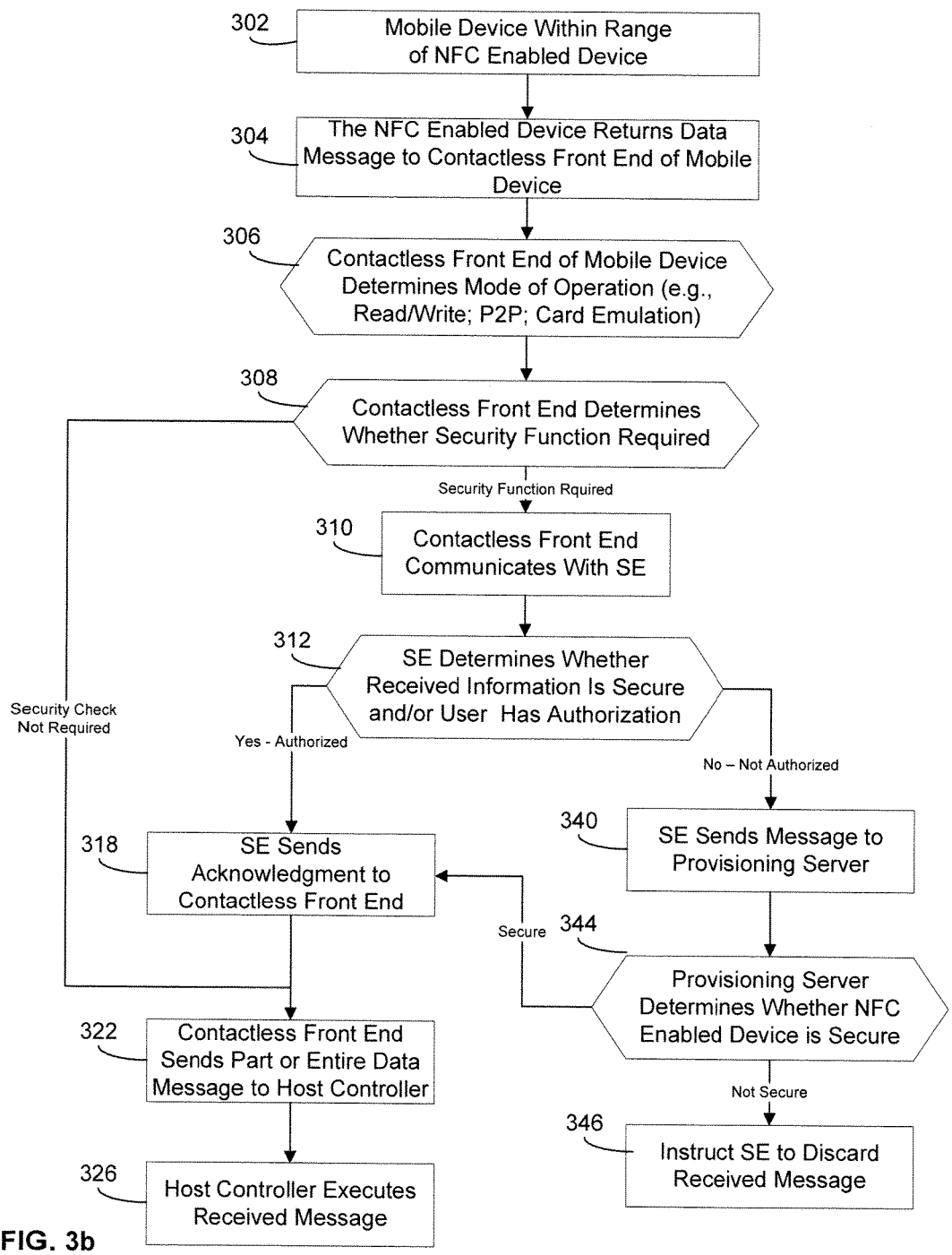
FIG. 3b is an exemplary flow chart useful in understanding interaction between the mobile device, an NFC enabled device, and a provisioning server.

FIG. 3*b* illustrates an exemplary communication flow between different components of a mobile device 11, (i.e., contactless front end 136 and secure element 137), an NFC enabled device 13, and a provisioning server 233. For discussion of the process flow of FIG. 3*b*, we will assume that an appropriate application is installed within mobile device 11 (e.g., part of the NFC chipset 136).

At step 302, the user brings the NFC enabled mobile device within proximity of an NFC enabled device 13 and thus within proximity of NFC sensor (in our example formed by the transceiver/chipset 136 and antenna 138). In this example, we will assume that the mobile device initiates the communication with the NFC enabled device 13 (e.g., a smart poster). Thus, the mobile device 11 acts as an initiator and generates the RF field to power the passive target, in this case chip 163 on the NFC enabled device 13. RF power may be received through magnetic induction through the antenna 169 and converted to power the chip 163 by the power module 165. Alternatively, as discussed above, the NFC enabled device may have its own power source.

At step 304, upon activation, the NFC enabled device 13 provides a data message to the contactless front end 136 (i.e., more specifically, the NFC controller 136*b*) of the mobile device 11. In one example, the data message includes a token, a tag Identification (ID), and a payload (e.g., URL link, message to be displayed on mobile device, coupon code, etc.).

At step 306, the contactless front end 136 determines the mode of operation for the present NFC communication. For example, the communication may be one of the following modes: (i) Read/Write, (ii) P2P, or (iii) card emulation. The contactless front end 136 determines the mode of operation. The mode of operation is determined by NFC controller 137 as defined by the International Organization for Standardization (ISO) 14443 standard. The mode of operation helps later determine whether a security feature should be used.

At step 308, the contactless front end 136 determines whether a security feature should be used for this data message. For example, any payment transaction (e.g., card emulation mode) between the mobile device 11 and the NFC enabled device 13 requires a security feature. Similarly, payloads that include information that direct the mobile device to a URL require a security feature. However, a simple business card exchange transaction may not require a security feature, depending on the level of security setting of the mobile device 11. In one example, whether or not to authenticate using the security feature is determined by the presence of a security token in the data. To this end, the CLF is customized to be able to retrieve the token from the NFC enabled device 13. In peer-to-peer mode, either device can push or pull the security token. In card emulation mode, the mobile device 11 provides the token if the NFC enabled device 13 (e.g., reader) sends the correct command challenge. In reader/writer mode, the mobile device 11 attempts to read the token.

In one example, the token can be embedded within existing standard data, such as additional NFC Data exchange Format (NDEF) data. In this example, the NFC CLF parses the NDEF headers.

If the mobile device 11 cannot validate the authenticity of the data message via an approved token, the mobile device 11 may prompt the user with a warning on a display of the mobile device 11. In one example, the URL (or any NFC NDEF data) in the payload of the data message may be displayed. The user may be offered an option to override the warning. To this end, if the user agrees (e.g., acknowledges the prompt), the data message is processed by the host processor 112. In one example, the user can turn OFF prompting altogether through the mobile device 11 system settings.

In one example, if the token is not recognized by the mobile device 11, the user can be provided a warning on the user interface (e.g., display). Upon overriding the warning, any subsequent transactions with the NFC enabled device 13 are automatically trusted. In one example, the user may choose to only accept transactions from the NFC Enabled Device for a predefined time.

If the contactless front end 136 determines that a security feature is not required, the method continues with step 322, discussed below. If a security feature is required, the method continues with step 310.

At step 310, the contactless front end 136 sends the data message that it received from the NFC enabled device 13 to the secure element (SE) 137 without going to the host controller 112. In one example, the contactless front end 136 includes location information (e.g., provided by the GPS receiver 134 of the mobile device 11) in addition to the data message that is sent to the SE 137.

At step 312, the SE 137 determines whether the data message is secure. In various examples, the SE 137 may compare at least one of the (i) payload, (ii) token, (iii) tag ID, (iv) location information (or any combination thereof) to the security information stored in the SE 137. Thus, the data message (or elements thereof) provides a digital signature for the NFC enabled device 13. The security information stored in the SE 137 may include keys for different tokens received from the provisioning server 233 (e.g., during a prior provisioning). The tokens are used to compare the data message (or part thereof) to the security information. Put differently, the digital signature of the NFC enabled device 13 is compared to the keys previously stored in the SE 137. If the SE has 137 has been previously provisioned for this data message by the provisioning server 233 and the authentication requirement is met, the method continues with step 318. Otherwise, the method continues with step 340 below.

At step 318, when the authentication requirement is met, the SE sends an acknowledgment to the CLF 136 that the transaction with the NFC enabled device 13 is indeed secure. For example, the acknowledgment may be a simple confirmation signal or a return of the entire data message. In one example, when the CLF 136 contacts the SE 137, it does so by addressing an Application ID (AID) (e.g., applets 142 to 144). When the CLF 136 sends the data message to the AID, the CLF 136 expects a response, as per ISO 7816. In the respond data, the SE applet can return the full token data and an authentication flag, or just the authentication flag to the CLF 136.

At step 322, the NFC controller releases the data message to the host controller 112 for execution. In one example, the NFC controller sends only the payload to the host controller 112 for execution (e.g., the token, tag ID, location information, etc., are first removed).

At step 326, the host controller 112 of the mobile device 11 executes the (identified as secure) data message. In various examples, execution of the payload by the host controller may trigger different events. For example, the mobile device may display a site based on the URL provided in the payload of the NFC enabled device 13; information from the SE may be released through a secure channel from the SE through the NFC controller back to the NFC enabled device 13; additional communication between the NFC enabled device 13 and the contactless front end 136 may be enabled; etc. For example, the key provided by the provisioning server 233 may configure the mobile device 11 to be used to unlock the door of a keyless entry system. In one example, the communication between the NFC enabled device 13 and the contactless front end 136 is in the form of NFC Data exchange Format (NDEF) message.

As mentioned in step 312, in one embodiment, if the authentication requirement is not met, the SE 137 sends the data message to a provisioning server 233 for validation (i.e., step 340).

At step 344, the provisioning server 233 determines whether a token exists for the received data message. For example, the provisioning server 233 includes or is associated with a database that includes tokens for various NFC enabled devices. The provisioning server 233 compares at least one of a (i) payload, (ii) token, (iii) tag ID, (iv) location information (or any combination thereof) received from the mobile device, to the security information stored in its (or its associated) database. If a token exists for NFC enabled device 13, the provisioning server 233 sends the token to the SE 137 of the mobile device for storage. The method then continues with step 318.

However, upon determining that a token does not exist for NFC enabled device 13, the provisioning server 233 sends a warning message to the SE 137 to discard the data message. In one embodiment, the warning message triggers an alert to be displayed on the user interface of the mobile device 11 to indicate that the transaction with the NFC enabled device 13 is not secure. In one embodiment, the user is provided an option to process the data message (e.g., go to the URL specified in the payload) even if the transaction may not be secure. For example, the user may choose to accept the risk and process the data message by selecting an override option on the user interface (e.g., display) of the mobile device 11.

Figure 4A:
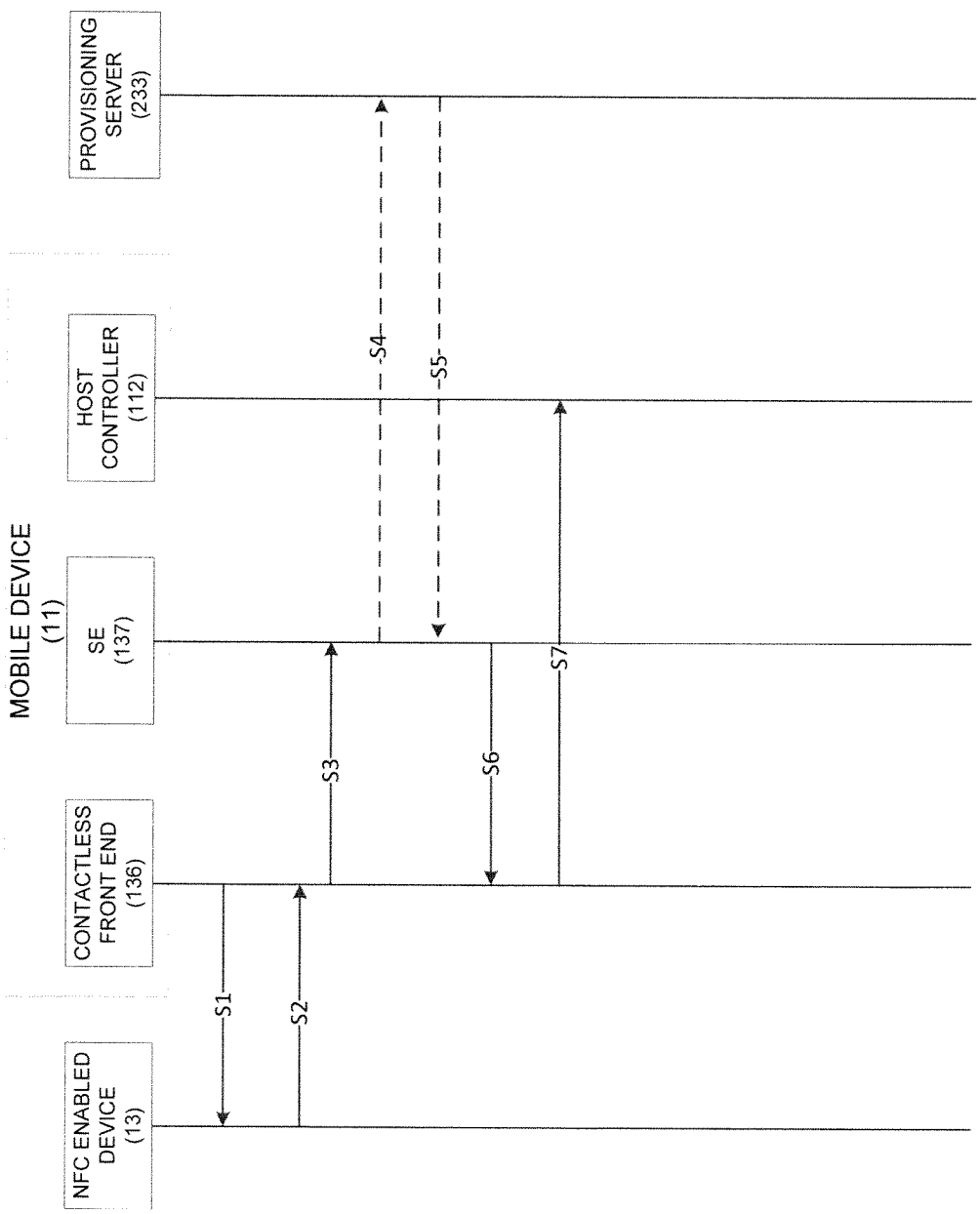
FIG. 4a is an exemplary call flow useful in understanding interaction between the mobile device, and an NFC enabled device.

It may be helpful now to consider a high-level discussion of exemplary call flows between different components of a mobile device 11 (i.e., contactless front end 136 and secure element 137), and an NFC enabled device 13. To this end, FIG. 4a illustrates an exemplary call flow where the steps in call flow are similar to the flow described in the context of FIG. 3b above. Accordingly, the steps of FIG. 4a are therefore not repeated in substantial detail for brevity.

At step S1, a user brings the NFC enabled mobile device within proximity of an NFC enabled device 13.

At step S2, the NFC enabled device 13 provides a data message (e.g., including token, a tag Identification (ID), and a payload) to the contactless front end 136 (i.e., more specifically, the NFC controller 136*b*) of the mobile device 11.

At step S3, the contactless front end 136 determines the mode of operation for the present NFC communication (e.g., (i) Read/Write, (ii) P2P, or (iii) card emulation mode). The NFC controller also determines whether a security feature should be used for this data message. If the contactless front end 136 determines that a security feature is not required, the data message is routed directly to the host controller 112. However, if a security feature is required, the data message is routed to the SE 137 (i.e., without going to the host controller 112). In one example, the contactless front end 136 may include location information to the data message that is sent to the SE 137.

At step S4, the SE 137 determines whether the data message is secure. In various examples, the SE 137 may compare at least one of the (i) payload, (ii) token, (iii) tag ID, (iv) location information (or any combination thereof) to the security information stored in the SE 137. Thus, the data message (or elements thereof) provides a digital signature for the NFC enabled device 13. The digital signature of the NFC enabled device 13 is compared to the keys previously stored in the SE 137. If the SE has 137 has been previously provisioned for this data message by the provisioning server 233 and authentication requirement is met, the flow continues with step S6. Otherwise, the SE sends the digital signature to the provisioning server 233 for authentication.

At step S5, the provisioning server 233 determines whether a token exists for the data message received. For example, the provisioning server 233 compares at least one of (i) payload, (ii) token, (iii) tag ID, (iv) location information (or any combination thereof) received from the mobile device 11 to the security information stored in its (or its associated) database. If a token exists for NFC enabled device 13, the provisioning server 233 sends the key to the SE 137 of the mobile device for storage.

At step S6, once the authentication requirement is met, the SE sends an acknowledgment to the contactless front end 136 that the transaction with the NFC enabled device 13 is indeed secure.

At step S7, the NFC controller releases the data message to the host controller 112 for execution. In one example, the NFC controller sends only the payload to the host controller 112 for execution (e.g., the token, tag ID, location information, etc., are first removed).

In one embodiment, at step S8, upon receiving confirmation from the SE 137, the contactless front end 136 engages in additional communication with the NFC enabled device 13. For example, the key provided by the provisioning server 233 may configure the mobile device to be used to unlock the door of a keyless entry system. In one example, the communication between the NFC enabled device 13 and the contactless front end 136 is in the form of NDEF. Since the security of the NFC enabled device has been confirmed, additional messages from the NFC enabled device 13 can be routed directly to the host controller 112 for execution.

Figure 4B:
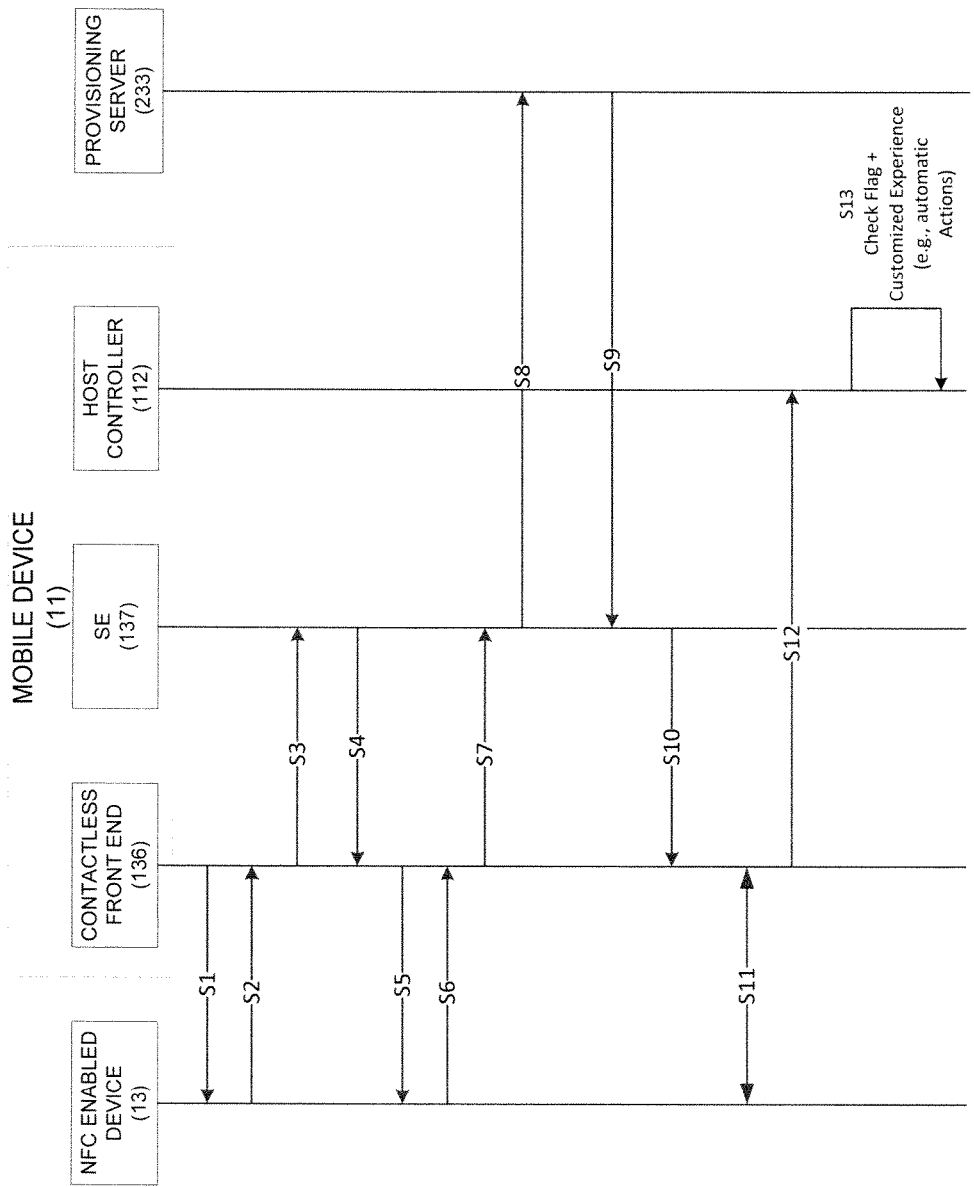
FIG. 4b is another exemplary call flow describing the interaction between the mobile device, an NFC enabled device, and a provisioning server.

Reference now is made to FIG. 4b, which illustrates another exemplary communication flow where features of an NFC enabled device are securely unlocked via a mobile device 11. For discussion of the process flow of FIG. 4b, we will assume that the mobile device 11 has a program stored in its memory (e.g., flash 114) that configures the mobile device to perform one or more functions (e.g., unlocking a keyless NFC enabled door, providing viewing preferences to the terminal 13 (e.g., an NFC enabled television or console), etc.).

At step S1 in the call flow of FIG. 4b, a user brings the NFC enabled mobile device within proximity of an NFC enabled device 13. For the purposes of this example, we will assume that the mobile device 11 initiates the communication, (although it will be understood that in other examples the NFC enabled device 13 may initiate the communication).

At step S2, the contactless front end 136 detects signals from the NFC enabled device 13 and recognizes that it is within NFC communication range.

The contactless front end 136 requests (i.e., S3) and receives (i.e., S4) secure information (e.g., key) from the SE 137 to provide to the NFC enabled device 13. For example, the secure information may include user preferences, such as channels, volume settings, etc., to provide an individualized experience with the NFC enabled device 13 (e.g., television or console in this example). In some examples, an additional tier of authentication is used in addition to the key from the SE 137. To this end, a biometric (e.g., a user's voice, fingerprint, etc.) identified by the mobile device 11 or additional pin information (e.g., static or one provided by a separate hardware token) could be used for additional security. For example, by identifying the fingerprint of the user, unauthorized users are prevented from using a lost or stolen mobile device 11 to gain access to various NFC enabled devices (e.g., 13).

At step S5, the NFC controller sends the key to the NFC enabled device 13. Upon authentication of the key, the NFC enabled device 13 unlocks its relevant features.

However, if the NFC enabled device 13 cannot authenticate the key (or a key is not provided by the NFC controller), at step S6 the NFC enabled device sends a data message to the contactless front end 136. For example, the data message includes at least one of a (i) payload, (ii) token, (iii) tag ID. The payload may include a key request.

At step S7, the contactless front end 136 determines whether a security feature should be used for this data message. Upon determining that a security feature is required, the contactless front end 136 sends the data message that it received from the NFC enabled device 13 to the secure element (SE) 137.

At step S8, the SE 137 determines whether it has the relevant key. In various examples, the SE 137 may compare at least one of the (i) payload, (ii) token, or (iii) tag ID (or any combination thereof) to the security information stored in the SE 137. Thus, the data message (or elements thereof) provides a digital signature for the NFC enabled device 13. The security information stored in the SE 137 may include keys for different tokens received from provisioning server 233 (e.g., during a prior provisioning) that are used to compare the data message (or part thereof) to the security information. Put differently, the digital signature of the NFC enabled device 13 is compared to the keys previously stored in the SE 137. Upon determining that the SE 137 has not been previously provisioned for this data message by the provisioning server 233 (e.g., the proper key does not exist in the SE 137), the SE 137 sends the data message to a provisioning server 233 to receive the requisite authorization therefrom. In one example, the SE includes its own identification (ID) information in the data message to the provisioning server 233.

At step S9, the provisioning server 233 identifies a user account (e.g., based on the ID information in the data message) and determines the subscription information. For example, the subscription information may include the television channels that the user of the mobile device 11 is authorized to use as well as other user preferences. Accordingly, the provisioning server 233 provides a key to the SE 137 with the proper preferences/authorizations. Thus, the key from the provisioning server 233 configures the mobile device 11 to be used to unlock the features of the NFC enabled device 13 that the user is entitled to.

At step S10, the SE 137 stores the key in its memory and provides the key to the contactless front end 136.

At step S11, the contactless front end 136 can now communicate with the NFC enabled device 13 to unlock the respective features with the key.

Accordingly, any subsequent content provided by the NFC enabled device 13 is routed to be executed by the host controller 112 without involvement of the SE 137 (i.e., step S12). In one example, the user of the mobile device 11 can now enjoy a customized experience with the NFC enabled device 13 (i.e., step S13).

As discussed above, functions relating to communications between NFC enabled devices and a secure element (SE)

and/or a host processor of a mobile device may be implemented using executable programming on an appropriate mobile device 11. Other functions, such as related provisioning, may involve communication with servers or the like connected for data communication via the components of a data network, such as the servers 233, 225, and/or 227 as shown in FIG. 4B. In addition to secure NFC transactions supported by the server(s) in the specific example of FIG. 4B, the same or other server(s) may support downloading of original or upgrade versions of the relevant programming for the mobile device 11, through a network to install the programming in the mobile device 11. Although special purpose devices may be used for any of these server functions, such servers also may be implemented using one or more hardware platforms intended to represent a general class of data processing device commonly used to run "server" programming so as to implement the respective functions discussed above, albeit with an appropriate network connection for data communication.

Figure 5:
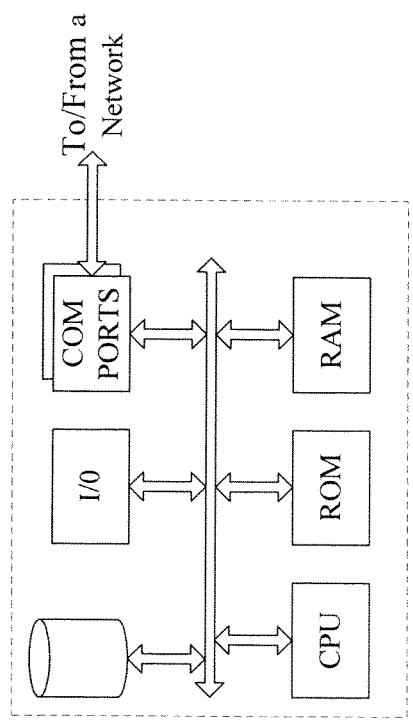
FIG. 5 is a simplified functional block diagram of a computer that may be configured as a server.
Figure 6:
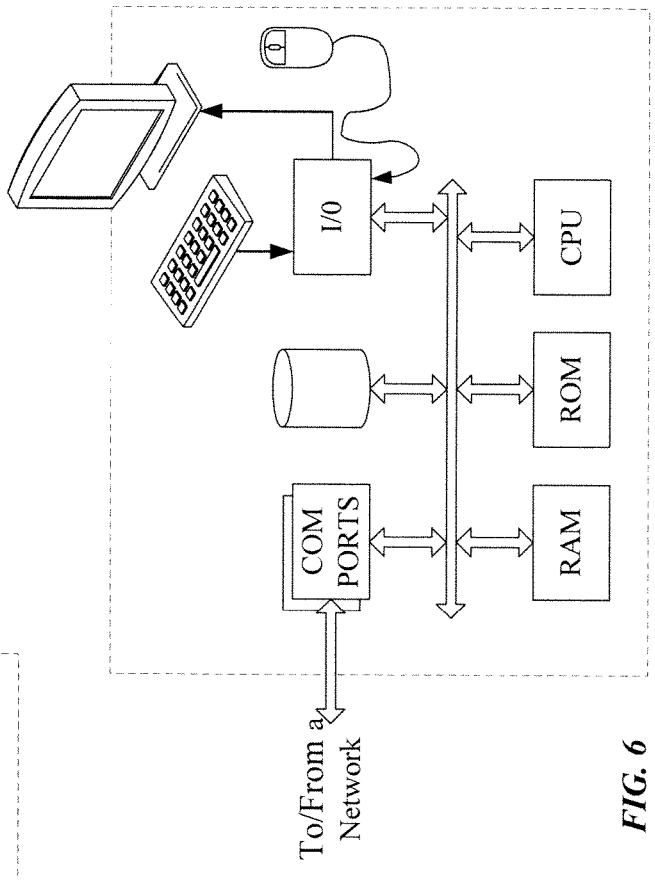
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that the structure, programming and general operation of such computer equipment and as a result the drawings should be self-explanatory.

The software functionalities involve programming, including executable code as well as associated stored data, e.g. executable code and associated data files used for the applications running on the mobile device 11 for the host controller 112 and the NFC controller 136b. The software code is executable by the host controller 112 or the NFC controller of the mobile device 11, although as noted, at times, such software may be stored in another computer platform and downloaded through a network for installation in the mobile device 11. Execution of such code by a host controller of the mobile device 11 and/or the NFC controller 136b enables the mobile device 11 to implement the methodology for handling the various NFC communications, conducting the associated action(s) and possibly providing relevant user input/output via the user interface of the device 11, in essentially the manner performed in the implementations discussed and illustrated herein.

Hence, aspects of the methods of NFC communication, provisioning of a mobile device, and related action processing outlined above may be embodied in programming. Program aspects of the technology may be thought of as "products" or "articles of manufacture" typically in the form of executable code and/or associated data that is carried on or embodied in a type of machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 201, 102, or 211 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

3GPP 3rd Generation Partnership Project
AID Application Identification

ATM Automatic Teller Machine
BS Base Station
BTS Base Transceiver System
CDMA Code Division Multiple Access
CLF Contactless Front End
CPU Central Processing Unit
CRM Customer Relations Management
DC Direct Current
EMS Enhanced Messaging Service
EVDO Evolution Data Optimized
GPS Global Positioning System
GSM Global System for Mobile
GUI Graphical User Interface
ID Identification
IP Internet Protocol
ISO International Organization for Standardization
LCD Liquid Crystal Display
LTE Long Term Evaluation
MMS Multimedia Messaging Service
NFC Near Field Communication
P2P Peer-to-Peer
PDA Personal Digital Assistant
PDN Packet Data Network
POS Point of Sale
PSTN Public Switched Telephone Network
RAM Random Access Memory
RAN Radio Access Network
RF Radio Frequency
SD Secure Digital
SE Secure Element
SIM Subscriber Identity Module
SMS Short Message Service
TDMA Time Division Multiple Access
UICC Universal Integrated Circuit Card
URL Universal Resource Locator
WAN Wide Area Network
XCVR Transceiver

What is claimed is:
1. A mobile device, comprising:
a wireless transceiver;
a host processor;
a mobile device memory storing mobile device instructions;
a global positioning system (GPS) receiver;
a near field communication (NFC) system comprising an NFC transceiver, an NFC processor, and an NFC memory storing NFC instructions; and
a security element (SE) chip communicatively coupled to the NFC processor and that includes:
  tamperproof storage,
  a secure element processor, and
  a secure element memory storing executable programming of a secure element application;
wherein the NFC system instructions, when executed by the NFC processor of the NFC system, cause the NFC processor of the NFC system to perform operations comprising
  initiating a data exchange with an NFC-enabled device,
  receiving, from the NFC-enabled device, an NFC message,
  receiving, from the GPS receiver, location information representative of a detected location of the NFC-enabled device;
  appending, to the received NFC message, the location information representative of the detected location of the NFC-enabled device,
  determining that the received NFC message requires a security function,
  routing, based on the determination that the received NFC message requires the security function and after appending the location information representative of the detected location to the received NFC message, the received NFC message to the SE chip without going to or from the host processor,
  receiving, from the SE chip, an acknowledgement that the received NFC message is secure, and
  based on the received acknowledgement, releasing a payload of the received NFC message to the host processor;
wherein the secure element application, when executed by the secure element processor of the SE chip, causes the secure element processor of the SE chip to perform operations comprising:
  receiving, from the NFC processor, the received NFC message,
  retrieving, from the secure element memory, stored location information representative of an expected location of the NFC-enabled device, and
  processing the received NFC message, wherein processing the received NFC message comprises:
    determining that the detected location represented in the appended location information is within a predetermined radius of the expected location represented in the stored location information,
    based on the determination that the detected location represented in the appended location information is within the predetermined radius of the expected location, determining that the NFC message is secure, and
    sending the acknowledgment to the NFC processor indicating that the received NFC message is secure; and
wherein the mobile device instructions, when executed by the host processor, cause the host processor to perform an operation comprising:
  receiving the payload of the received NFC message from the NFC processor, and
  executing the payload of the received NFC message.
2. The mobile device of claim 1, wherein the SE chip is implemented within at least one of an integrated circuit card and a subscriber identity module used by the mobile device for communication through the network.
3. The mobile device of claim 1, wherein the received NFC message comprises at least one of:
a token; and
an identification (ID) of the NFC-enabled device.
4. The mobile device of claim 1, wherein the determining that the received NFC message is secure further comprises analyzing information in the received NFC message according to a rule set stored in the tamperproof storage of the SE chip, the rule set associated with authorization keys provided by the provisioning server.
5. The mobile device of claim 4, wherein the secure element application, when executed by the secure element processor of the SE chip, further causes the secure element processor of the SE chip to perform an operation of:
  receiving the rule set from the provisioning server before receiving the received NFC message from the NFC processor.
6. The mobile device of claim 4, wherein the secure element application, when executed by the secure element processor of the SE chip, further causes the secure element processor of the SE chip to perform operations of:

determining that a key for the received NFC message received from the NFC processor is not stored in the SE chip;

sending the received NFC message to the provisioning server; and receiving the rule set from the provisioning server.

7. The mobile device of claim 4, wherein the SE chip receives the rule set from the provisioning server using the wireless transceiver.

8. A method comprising:

initiating, by a near field communication (NFC) controller included in an NFC system included in a mobile device, a data exchange with an NFC-enabled device;

receiving, by the NFC controller from the NFC-enabled device, an NFC message;

determining, by a global positioning system (GPS) receiver included in the mobile device, location information representative of a detected location of the NFC-enabled device;

appending, by the NFC controller to the received NFC message, the location information representative of the detected location of the NFC-enabled device;

determining, by the NFC controller, that the received NFC message requires a security function;

routing, by the NFC controller based on the determination that the received NFC message requires the security function and after appending the location information representative of the detected location to the received NFC message, the received NFC message to a security element (SE) chip included in the mobile device without going to or from a host processor of the mobile device, the SE chip including tamperproof storage and memory in which is stored executable programming of an application;

retrieving, by the SE chip from the memory, stored location information representative of an expected location of the NFC-enabled device;

processing, by the SE chip, the received NFC message in accordance with the executable programming of the application stored in the memory, wherein processing the received NFC message comprises:

determining, by the SE chip, that the detected location represented in the appended location information is within a predetermined radius of the expected location represented in the stored location information, based on the determination that the location represented in the appended location information is within the predetermined radius of the expected location, determining, by the SE chip, that the NFC message is secure, and sending, by the SE chip, an acknowledgment to the NFC controller indicating that the received NFC message is secure;

releasing, by the contactless front end, the received NFC message to the host processor; and executing, by the host processor, the received NFC message.

9. The method of claim 8, wherein the SE chip is implemented within at least one of an integrated circuit card and a subscriber identity module used by the mobile device for communication through a network.

10. The method of claim 8, wherein the received NFC message comprises at least one of:

a token; and an identification (ID) of the NFC-enabled device.

11. The method of claim 8, wherein determining that the NFC message is secure further comprises:

analyzing information in the received NFC message according to a rule set stored in the tamperproof storage of the SE chip, the rule set associated with authorization keys provided by the provisioning server.

12. The method of claim 11, further comprising: receiving, by the SE chip, the rule set from the provisioning server before receiving the received NFC message from the NFC controller.

13. The method of claim 11, further comprising:

determining, by the SE chip, that a key for the received NFC message received from the NFC controller is not stored in the SE chip;

sending the received NFC message to the provisioning server; and receiving the rule set from the provisioning server.

14. The method of claim 11, wherein the SE chip receives the rule set from the provisioning server over a wireless data communication network.

* * * * *